United States Patent
Baba et al.

(10) Patent No.: US 11,305,386 B2
(45) Date of Patent: Apr. 19, 2022

(54) HEAT EXCHANGER, AIR CONDITIONER, AND APPARATUS FOR MANUFACTURING HEAT EXCHANGER

(71) Applicant: Mitsubishi Electric Corporation, Tokyo (JP)

(72) Inventors: Toshimichi Baba, Tokyo (JP); Nobuaki Miyake, Tokyo (JP); Takashi Kato, Tokyo (JP); Ryoichi Ikeda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 225 days.

(21) Appl. No.: 16/484,187

(22) PCT Filed: Jan. 19, 2018

(86) PCT No.: PCT/JP2018/001536
§ 371 (c)(1),
(2) Date: Aug. 7, 2019

(87) PCT Pub. No.: WO2018/193678
PCT Pub. Date: Oct. 25, 2018

(65) Prior Publication Data
US 2021/0285662 A1    Sep. 16, 2021

(30) Foreign Application Priority Data

Apr. 20, 2017  (JP) .............................. JP2017-083999

(51) Int. Cl.
*B23P 15/26*      (2006.01)
*B21C 37/22*      (2006.01)
(Continued)

(52) U.S. Cl.
CPC .............. *B23P 15/26* (2013.01); *B21C 37/22* (2013.01); *B21D 53/08* (2013.01); *B21D 53/085* (2013.01);
(Continued)

(58) Field of Classification Search
CPC .......................... Y10T 29/49373; B21D 53/02
See application file for complete search history.

(56) References Cited

U.S. PATENT DOCUMENTS 3,815,203 A * 6/1974 Schulenberg ........ B21D 53/085
                                                    29/726
4,380,854 A * 4/1983 Jonason ................... B23P 15/26
                                                    29/890.047
(Continued)

FOREIGN PATENT DOCUMENTS

CN      102310320 A     1/2012
CN      205156305 U     4/2016
(Continued)

OTHER PUBLICATIONS

Office Action dated Jan. 25, 2021 issued in Chinese Patent Application No. 201880024456.8, with English translation (16 pages).
(Continued)

*Primary Examiner* — Jason L Vaughan
(74) *Attorney, Agent, or Firm* — Buchanan Ingersoll & Rooney PC

(57) ABSTRACT

A heat exchanger includes a flat tube and a plurality of fins. The plurality of fins are arranged on the flat tube and inclined with respect to a longitudinal direction of a cross section perpendicular to an axis of the flat tube. The plurality of fins may be inclined at different angles with respect to the axis of the flat tube. The flat tube may include a straight portion on which the plurality of fins are arranged, and a bend on which at least one fin other than the plurality of fins is arranged. The at least one fin extends perpendicularly to the axis of the flat tube.

9 Claims, 12 Drawing Sheets

(51) Int. Cl.
*B21D 53/08* (2006.01)
*B23P 19/04* (2006.01)
*F28F 1/34* (2006.01)
*F24F 1/18* (2011.01)
*F28F 1/02* (2006.01)
*F28F 1/32* (2006.01)

(52) U.S. Cl.
CPC ............... *B23P 19/04* (2013.01); *F28F 1/34* (2013.01); *F24F 1/18* (2013.01); *F28F 1/02* (2013.01); *F28F 1/325* (2013.01); *F28F 2215/04* (2013.01); *F28F 2215/12* (2013.01)

(56) References Cited

U.S. PATENT DOCUMENTS

| | | | | |
|---|---|---|---|---|
| 4,407,064 A | * | 10/1983 | Denner | B21C 37/24 29/726 |
| 5,737,828 A | * | 4/1998 | Barnes | B21D 53/027 29/726 |
| 2014/0374077 A1 | | 12/2014 | Lee et al. | |

FOREIGN PATENT DOCUMENTS

| | | |
|---|---|---|
| JP | S63299830 A | 12/1988 |
| JP | H02298796 A | 12/1990 |
| JP | H03204129 A | 9/1991 |
| JP | H0590214 U | 12/1993 |
| JP | 2004101154 A | 4/2004 |
| JP | 2012-030284 A | 2/2012 |
| JP | 2013059847 A | 4/2013 |
| JP | 2014-149096 A | 8/2014 |
| JP | 2016048162 A | 4/2016 |
| WO | 2016110930 A1 | 7/2016 |

OTHER PUBLICATIONS

Office Action dated Jun. 30, 2020, issued in corresponding Japanese Patent Application No. 2019-513229, 8 pages including 4 pages of English translation.
Office Action dated Jul. 2, 2020, issued in corresponding Chinese Patent Application No. 201880024456.8, 12 pages including 6 pages of English translation.
Extended European Search Report dated Mar. 10, 2020 for corresponding European patent application No. 18787312.0, 5 pages.
International Search Report (PCT/ISA/210) with translation, and Written Opinion (PCT/ISA/237) dated Mar. 20, 2018, by the Japan Patent Office as the International Searching Authority for International Application No. PCT/JP2018/001536.

* cited by examiner

HEAT EXCHANGER, AIR CONDITIONER, AND APPARATUS FOR MANUFACTURING HEAT EXCHANGER

TECHNICAL FIELD

The present disclosure relates to a heat exchanger, an air conditioner, and an apparatus for manufacturing a heat exchanger.

BACKGROUND ART

A heat exchanger includes a heat-transfer tube through which a coolant passes, and fins arranged in the axial direction of the heat-transfer tube. Air flows between the fins to exchange heat with the coolant. Air blown by a fan in a heat exchanger may have resistance that varies depending on the position relative to the fan. A technique has been developed for changing a pitch between the fins in accordance with the position of the heat exchanger to achieve uniform airflow resistance.

For example, Patent Literature 1 describes a heat exchanger including fins arranged in an area receiving a smaller amount of air from the fan with a larger pitch than fins arranged in other areas.

Patent Literature 2 describes a heat exchanger including fewer fins arranged with a larger pitch in a boundary area between a bend and a straight portion of a heat-transfer tube.

Patent Literature 3 describes an apparatus for manufacturing a heat exchanger including a flat-tube holder, fin holders holding fins, and a drum rotatable over the flat-tube holder and having an outer periphery on which the fin holders are arranged at regular intervals. The apparatus described in Patent Literature 3 translates the flat-tube holder in parallel with the tangent to the outer periphery of the drum, and rotates the drum to sequentially attach the fins held by the fin holders to flat tubes held by the flat-tube holder. The movement speed of the flat-tube holder or the rotation speed of the drum is changed to set the pitch between the fins as appropriate.

Patent Literature 4 describes a method for manufacturing a heat exchanger including a spiral finned tube obtained by form-rolling of a cylindrical aluminum tube. The manufacturing method described in Patent Literature 4 can form a bend easily by removing parts of the spiral fins and then bending the tube at the position at which the spiral fins have been removed. The obtained heat exchanger includes no fin at the bend.

CITATION LIST

Patent Literature

Patent Literature 1: Unexamined Japanese Patent Application Kokai Publication No. 2016-48162
Patent Literature 2: Unexamined Japanese Utility Model Application Kokai Publication No. H5-90214
Patent Literature 3: Unexamined Japanese Patent Application Kokai Publication No. 2013-59847
Patent Literature 4: Unexamined Japanese Patent Application Kokai Publication No. H3-204129

SUMMARY OF INVENTION

Technical Problem

The heat exchangers described in Patent Literatures 1 and 2 cause less air to flow between the fins when air is blown from the fan in a direction different from the direction in which the fins extend. The heat exchangers thus may have difficulties in enhancing heat exchange efficiency.

Similarly, the heat exchanger manufactured by the apparatus for manufacturing a heat exchanger described in Patent Literature 3 has difficulties in enhancing heat exchange efficiency.

The heat exchanger manufactured by the method described in Patent Literature 4 includes the spiral fins extending in a uniform direction. The heat exchanger thus has difficulties in enhancing heat exchange efficiency when air is blown in a direction different from the direction in which the fins extend. Further, this method includes form-rolling of the cylindrical tube, and is difficult with a flat tube. The manufacturing method described in Patent Literature 4 is thus not suitable for a heat exchanger formed from a flat tube.

In response to the above issue, one or more aspects of the present disclosure are directed to a heat exchanger including a flat tube, an air conditioner, and an apparatus for manufacturing a heat exchanger that allow easy manufacture and have high heat exchange efficiency.

Solution to Problem

To achieve the objective, a heat exchanger according to the present disclosure includes a flat tube and a plurality of fins. The plurality of fins are arranged on the flat tube and inclined with respect to a longitudinal direction of a cross section perpendicular to an axis of the flat tube.

Advantageous Effects of Invention

The structure according to one or more aspects of the present disclosure includes fins that have small resistance against air blown in a direction in which the fins are inclined. The structure including the fins inclined with respect to the airflow direction has smaller airflow resistance. The heat exchanger with this structure thus enhances heat exchange efficiency. The heat exchanger with the fins simply inclined with respect to the flat tube can be manufactured easily.

DESCRIPTION OF EMBODIMENTS

Figure 1:
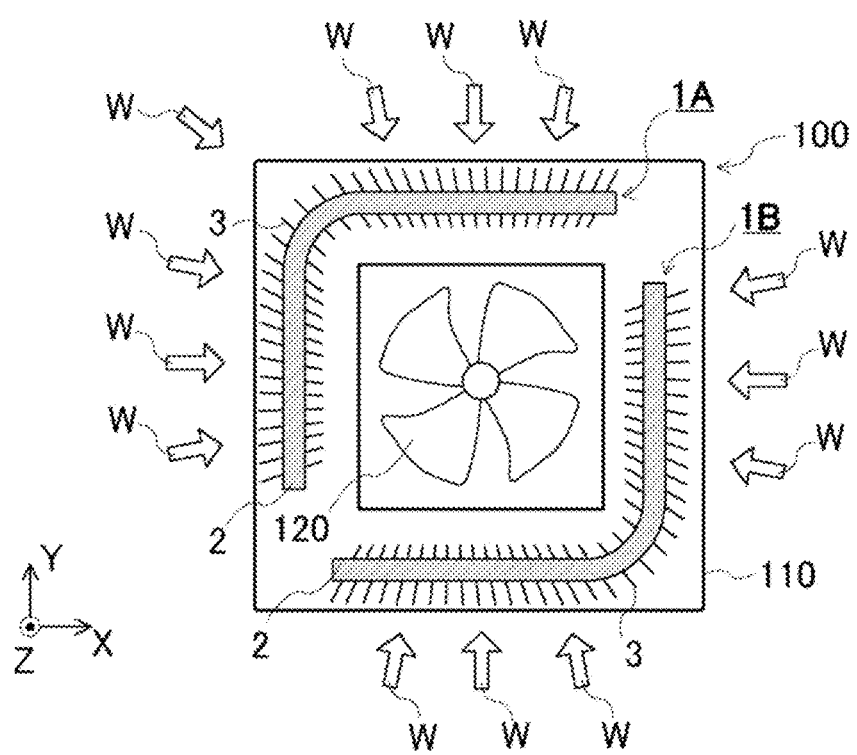
FIG. 1 is a cross-sectional view of an air conditioner according to Embodiment 1 of the present disclosure.

A heat exchanger, an air conditioner, and an apparatus for manufacturing a heat exchanger according to one or more embodiments of the present disclosure will now be described in detail with reference to the drawings. Throughout the drawings, the same or equivalent components are denoted by the same reference numerals. With the orthogonal XYZ-coordinate system in each figure, X-axis represents the lateral direction, Z-axis represents the vertical direction, and Y-axis represents the direction orthogonal to X- and Z-axes in the horizontal cross section of an outdoor unit of an air conditioner. This coordinate system will be hereafter referred to as appropriate.

Embodiment 1

An air conditioner according to Embodiment 1 includes a fan at the center and a heat exchanger surrounding the fan. The heat exchanger includes fins extending toward the fan center. Some of the fins are inclined with respect to flat tubes. The structure of the air conditioner will now be described with reference to FIGS. 1 to 3.

Figure 2:
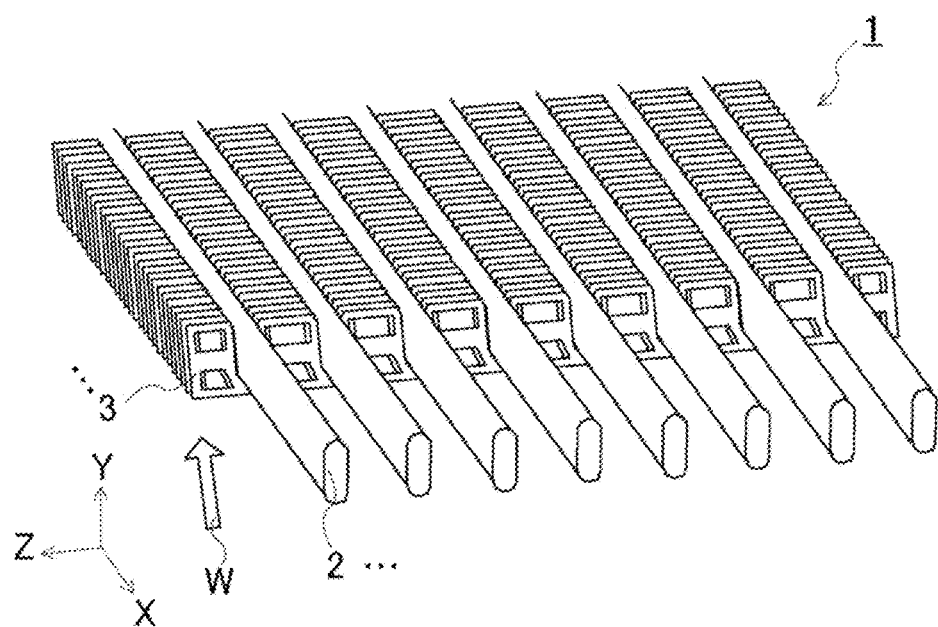
FIG. 2 is an enlarged view of a heat exchanger for the air conditioner according to Embodiment 1.
Figure 3:
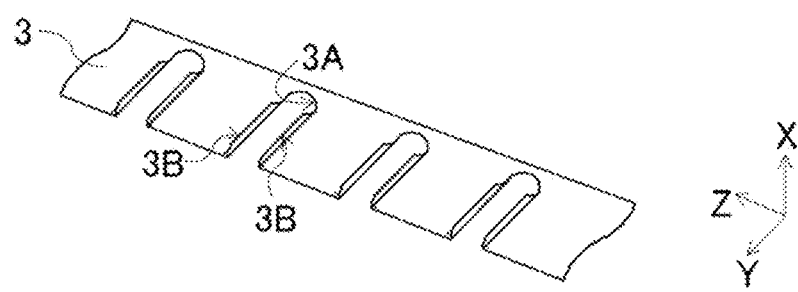
FIG. 3 is a perspective view of fins included in the heat exchanger for the air conditioner according to Embodiment 1.

FIG. 1 is a cross-sectional view of an air conditioner 100 according to Embodiment 1 of the present disclosure. FIG. 2 is an enlarged view of a heat exchanger 1 for the air conditioner 100 according to Embodiment 1. FIG. 3 is a perspective view of a fin 3 included in the heat exchanger 1 for the air conditioner 100 according to Embodiment 1. For ease of understanding, FIG. 1 does not show components of the air conditioner 100 other than a housing 110, a fan 120, and the heat exchanger 1. FIG. 2 does not show parts of flat tubes 2 and some of the fins 3.

As shown in FIG. 1, the air conditioner 100 includes the housing 110 that is square in a horizontal or XY cross-sectional view, the fan 120 at the center of the housing 110, and heat exchangers 1A and 1B arranged in the housing 110 and facing the side walls of the housing 110.

The fan 120 in the air conditioner 100 rotates at the center of the housing 110 in an XY cross-sectional view to take in outside air through the side walls of the housing 110 located in X- and Y-directions and blow the air in the negative Z-direction. In the air conditioner 100, outside air flows through the heat exchanger 1 in different directions W corresponding to the directions from which outside air is taken in through the side walls. In the air conditioner 100, to maximize the amount of outside air taken in through the side walls to pass through the heat exchanger 1, the heat exchanger 1A is bent at an angle of 90° in the center to face the side walls located in the negative X- and positive Y-directions. The heat exchanger 1B is bent at an angle of 90° in the center to face the side walls located in the positive X- and negative Y-directions.

The heat exchangers 1A and 1B each include flat tubes 2 and multiple fins 3 arranged in the axial direction of the flat tubes 2. In the heat exchangers 1A and 1B, the fins 3 extend in outside air directions W in which the fan 120 blows air to prevent airflow resistance from varying depending on the outside-air flow direction. The fins 3 extend in different directions depending on the positions of the fins 3. More specifically, the fins 3 extend perpendicularly to or in a manner inclined with respect to the axis of the flat tubes 2. The heat exchangers 1A and 1B each have the same structure except the positions, and are hereafter collectively referred to as the heat exchanger 1.

As shown in FIG. 2, the heat exchanger 1 includes multiple flat tubes 2 with axes extending in X-direction. The flat tubes 2 are flat in a cross section perpendicular to the axial direction, or in a YZ cross section. A liquid coolant for heat exchange flows into or out of each flat tube 2. As described above, FIG. 2 shows parts of the flat tubes 2. Although not shown in FIG. 2, the flat tubes 2 extending in the positive X-direction are bent in the positive Y-direction, and the flat tubes 2 extending in the negative X-direction are bent in the negative Y-direction.

As shown in FIG. 3, each fin 3 is formed from a rectangular flat plate having fin slits 3A on one longitudinal side. The fin slits 3A are fitting grooves into which the flat tubes 2 are fitted. The fin slits 3A are U-shaped to receive the flat tubes 2. Each fin slit 3A has fin collars 3B protruding in the positive X-direction to hold the outer periphery of the received flat tube 2. The fin collars 3B are located only in straight portions of the U shape extending in Y-direction to allow the flat tube 2 having the axis inclined with respect to or perpendicular to the fin 3 to be fitted to the fin 3. The fin slits 3A are located at regular intervals in the longitudinal direction of the fin 3.

Referring back to FIG. 2, to reduce the airflow resistance, the fins 3 are inclined with respect to the longitudinal direction of the flat tube 2 in the YZ cross section to be parallel to the outside air directions W. The heat exchanger 1 thus enhances heat exchange efficiency.

A method for manufacturing the heat exchanger 1 will now be described with reference to FIGS. 4 and 5.

Figure 4:
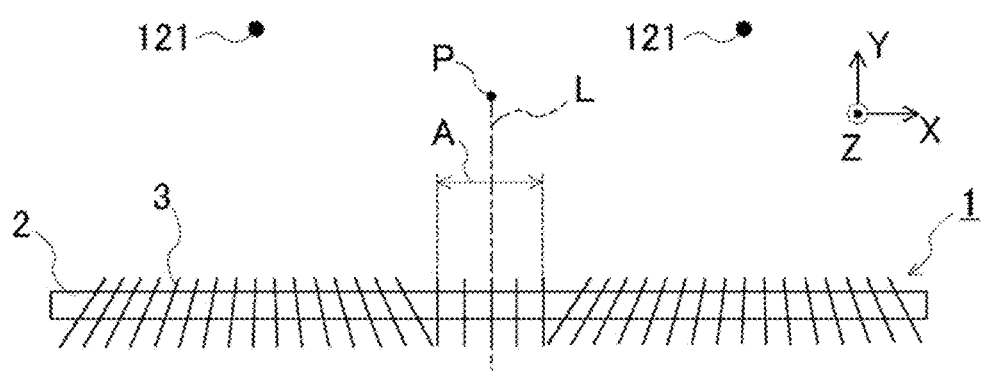
FIG. 4 is a plan view of one flat tube of a heat exchanger before bent with a method for manufacturing the heat exchanger for the air conditioner according to Embodiment 1.
Figure 5:
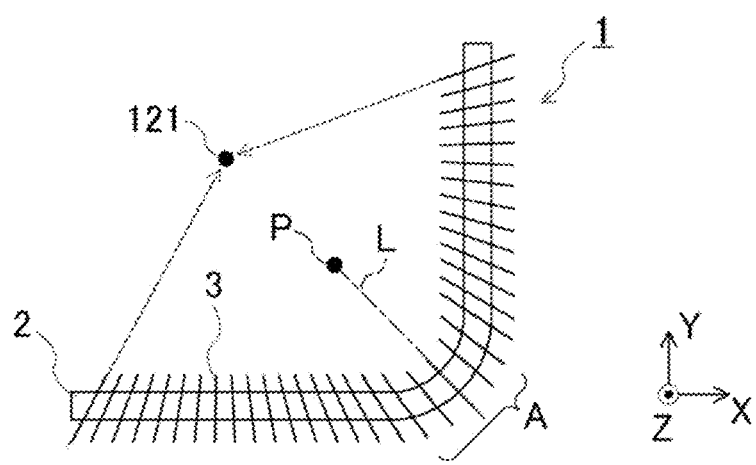
FIG. 5 is a plan view of the flat tube of the heat exchanger after bent with the method for manufacturing the heat exchanger for the air conditioner according to Embodiment 1.

FIG. 4 is a plan view of one flat tube 2 for the heat exchanger 1 before bent with a method for manufacturing a heat exchanger for the air conditioner 100 according to Embodiment 1. FIG. 5 is a plan view of the flat tube 2 for the heat exchanger 1 after bent with the method for manufacturing the heat exchanger 1 for the air conditioner 100 according to Embodiment 1.

First, multiple fins 3 pressed into the above shape and multiple linear flat tubes 2 are prepared. The flat tubes 2 are arranged with a regular pitch to have the cross section taken perpendicular to the axes having the longitudinal directions parallel to each other, and to have the axes parallel to each other. The pitch between the flat tubes 2 is equal to the pitch between the fin slits 3A.

Subsequently, one of the multiple fins 3 is held with the longitudinal direction extending perpendicularly to the axes of the flat tubes 2 and with the openings of the fin slits 3A facing the flat tubes 2. The plate surface of the fin 3 is inclined with respect to or perpendicular to the axes of the flat tubes 2. Here, the plate surface of the fin 3 is perpendicular to or inclined with respect to the axes of the flat tubes 2 toward a rotation center 121 of the fan 120 to be located on the heat exchanger 1 incorporated into an air conditioner.

Subsequently, the inclined or perpendicular fin 3 is pressed against the flat tubes 2 to fit the flat tubes 2 into the fin slits 3A. Here, the fin collars 3B are placed into contact with the side surfaces of the flat tubes 2 to attach the fin 3 to the flat tubes 2. The fin 3 may be inclined with respect to or perpendicular to the flat tubes 2 after pressed against the flat tubes 2. This step is hereafter referred to as an attachment step.

The attachment step is repeated to attach the remaining fins 3 to the flat tubes 2 with a regular pitch. This pitch in the heat exchanger 1 may be varied for each fin 3 attached in accordance with the estimated airflow rate.

The heat exchanger 1 including the linear flat tubes 2 with the structure shown in FIG. 4 is prepared through the above processes. In the heat exchanger 1 including the linear flat tubes 2, the fins 3 located in the positive X- and negative X-directions of an area A shown in FIG. 4 extend toward the expected position of the rotation center 121 of the fan 120. The fins 3 in the area A are located in a bend of the flat tubes 2 (described later), and thus extend parallel to a straight line L perpendicular to the axes of the flat tubes 2. In the heat exchanger 1 including the linear flat tubes 2, the fins 3 extend in different directions in accordance with the portions of the flat tube 2 to which the fins 3 are attached.

Subsequently, depending on the use of the heat exchanger 1, the linear flat tubes 2 in the heat exchanger 1 are bent as appropriate. For example, as shown in FIG. 5, the linear heat exchanger 1 is bent at a point P on the straight line L at an angle of 90°. Thus, the heat exchanger 1 having a bend shown in FIG. 5 is prepared (this step is hereafter referred to as a bending step). In the heat exchanger 1 shown in FIG. 5, the fins 3 in the above area A extend toward the point P, and toward substantially the rotation center 121 of the fan 120. The fins 3 located in the negative X- and positive X-directions similarly extend toward the rotation center 121 of the same fan 120. Thus, the heat exchanger 1 shown in FIG. 5 has airflow rates with less variations.

After the attachment step is repeated or the bending step is performed as appropriate, the flat tubes 2 and the fins 3 may be brazed.

As described above, in the heat exchanger 1 according to Embodiment 1, the fins 3 extend toward the rotation center 121 of the fan 120. In other words, the fins 3 extend parallel to the air-blowing direction. The heat exchanger 1 thus has small airflow resistance and high heat exchange efficiency.

The heat exchanger 1 allows air to flow in the longitudinal direction in a cross section perpendicular to the axes of the flat tubes 2, and thus has higher heat exchange efficiency.

Embodiment 2

In Embodiment 2, an apparatus for manufacturing the heat exchanger 1 according to Embodiment 1 will be described. The apparatus according to Embodiment 2 is used in the above attachment step to attach the fins 3 one by one to the flat tubes 2 at predetermined intervals. The structure of the apparatus according to Embodiment 2 will now be described with reference to FIGS. 6 and 7.

Figure 6:
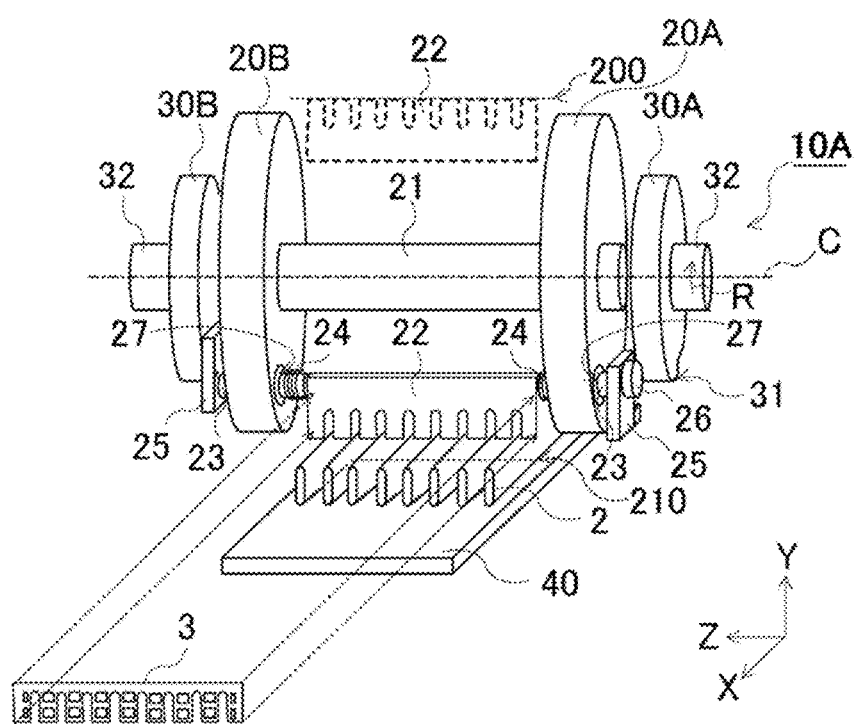
FIG. 6 is a perspective view of an apparatus for manufacturing a heat exchanger according to Embodiment 2 of the present disclosure.
Figure 7:
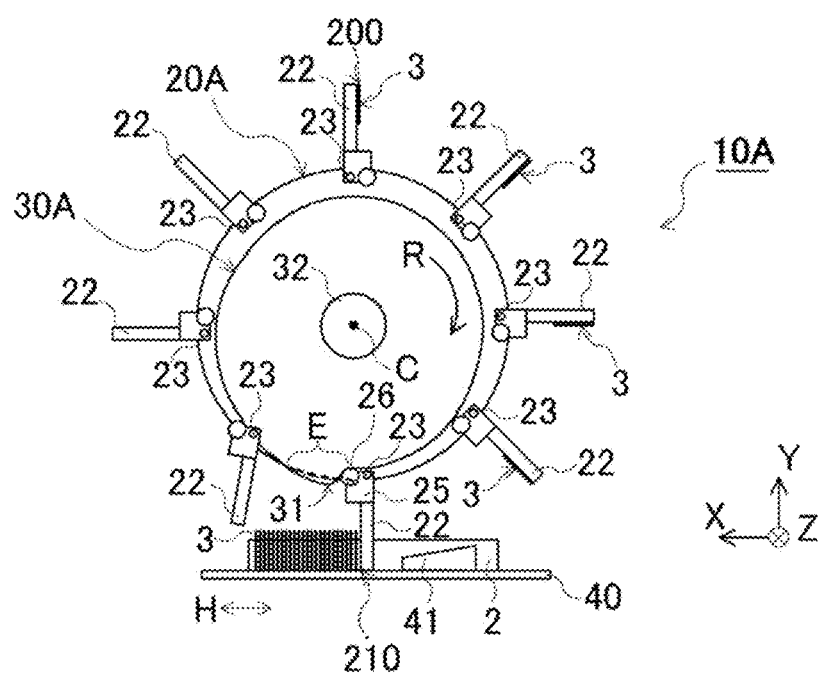
FIG. 7 is a side view of the apparatus according to Embodiment 2.

FIG. 6 is a perspective view of an apparatus 10A for manufacturing a heat exchanger according to Embodiment 2 of the present disclosure. FIG. 7 is a side view of the apparatus 10A according to Embodiment 2. For ease of understanding, FIG. 6 simply shows one of fin holders 22 on drums 20A and 20B. In FIGS. 6 and 7, moving mechanisms such as a servomotor that rotates the drums 20A and 20B and a linear guide that moves a movable stage 40 are not shown. FIGS. 6 and 7 show the heat exchanger 1 manufactured by the apparatus for manufacturing a heat exchanger in an orthogonal coordinate system, similarly to the orthogonal XYZ-coordinate system for the heat exchanger 1 shown in FIGS. 1 to 5. In the plane of the apparatus 10A perpendicular to the center axis C of the drums 20A and 20B, X-axis represents the lateral direction, Y-axis represents the vertical direction, and Z-axis represents the direction of the center axis C. The orthogonal XYZ-coordinate system is similar to the coordinate system in FIGS. 8 to 13 described below.

As shown in FIGS. 6 and 7, the apparatus 10A includes the drums 20A and 20B, the fin holders 22, cam members 30A and 30B, cam followers 26, and cam movers (not shown). The drums 20A and 20B are rotatable about a center axis C to move the fed fins 3 from a fin holding position 200 to a fin attaching position 210. The fin holders 22 are arranged in the radial direction of the drums 20A and 20B to hold the fins 3. The cam members 30A and 30B change the inclination of the fins 3 held by the fin holders 22 to an appropriate angle. The cam followers 26 are arranged on the fin holders 22 to be guided by the cam members 30A and 30B. The cam movers move the cam members 30A and 30B to change the rotation amount of the fin holders 22. The apparatus 10A also includes a flat tube positioner 41 and a movable stage 40. The flat tube positioner 41 restricts the flat tubes 2 in the negative Y-direction of the drums 20A and 20B to restrict the flat tubes 2 at intended relative positions. The movable stage 40 moves the flat tubes 2 restricted by the flat tube positioner 41 in the positive X-direction of the drums 20A and 20B to change the relative positions between the fin 3 held by the fin holder 22 and the flat tubes 2.

As described later, the flat tubes 2 are fixed to the movable stage 40. The movable stage 40 and the flat tube positioner 41 are not connected and are separate. The position of the flat tube positioner 41 remains unchanged after the movable stage 40 moves in X-direction.

As shown in FIG. 6, the drums 20A and 20B have the same cylindrical shape with the same size. The drums 20A and 20B are coupled with a shaft 21 extending in Z-direction. The drums 20A and 20B are rotatable clockwise, or in R-direction by a servomotor (not shown) that rotates the shaft 21. The fin holders 22 are held between the drums 20A and 20B.

The fin holders 22 are arranged in the radial direction of the drums 20A and 20B at or around the outer peripheries. The fin holders 22 are arranged with a regular pitch along the outer peripheries of the drums 20A and 20B as shown in FIG. 7 to continuously feed the fins 3 to the flat tubes 2 restricted by the flat tube positioner 41 as the drums 20A and 20B rotate. More specifically, the apparatus 10A includes eight fin holders 22.

Referring back to FIG. 6, each fin holder 22 is formed from a rectangular plate with U-shaped slits. Here, the fin holders 22 are longer in the longitudinal and lateral directions than the fins 3 to hold the fins 3. The U-shaped slits are larger than the fin slits 3A to prevent interference with the fin slits 3A. The U-shaped slits in the fin holders 22 are open outward in the direction of the outer peripheries of the drums 20A and 20B to have the fin slits 3A facing the flat tubes 2 held by the flat tube positioner 41. More specifically, the U-shaped slits in the fin holders 22 face in the negative Y-direction in FIG. 6, and are open outward in the direction of the outer periphery of the drum 20A in FIG. 7.

Although not shown, each fin holder 22 has a vacuum tube and a suction hole coupled to a vacuum pump through an electromagnetic valve to hold the fins 3. The fin holder 22 holds or releases the fin 3 by opening or closing the electromagnetic valve. More specifically, the fin holder 22 reaching the fin holding position 200 as the drums 20A and 20B rotate opens the electromagnetic valve to suck and hold the fin 3. The fin holder 22 reaching the fin attaching position 210 as the drums 20A and 20B rotate closes the electromagnetic valve to release the fin 3. Here, the fin holding position 200 and the fin attaching position 210 are respectively in the positive Y- and negative Y-directions of the drums 20A and 20B across the center axis C.

While the electromagnetic valve is closed, air may be blown into the suction hole to return the pressure inside of the suction hole from a vacuum to the normal pressure. Instead of an electromagnetic valve, a disk that rotates in synchronization with the drums 20A and 20B and that has a through-hole may be provided, and the disk may rotate to align the through-hole with the end of the vacuum tube to open a vacuum path. Also, the disk may rotate to misalign the through-hole with the end of the vacuum tube to close the vacuum path with the disk.

As shown in FIG. 6, rotation shafts 23 are fixed to both ends of each fin holder 22 in Z-direction. The rotation shafts 23 are rotatably held by bearings (not shown) fixed to through-holes 27 extending through the drums 20A and 20B. Plates 25 are respectively arranged at ends of the rotation shafts 23 in the positive and negative Z-directions. The plates 25 rotatably hold the cam followers 26 that control the rotation of the rotation shafts 23.

The cam followers 26 come in contact with the cam members 30A and 30B and roll. Each cam follower 26 has a rotation center located at a different position from the corresponding rotation shaft 23 on the corresponding plate 25. The cam followers 26 roll when in contact with the cam members 30A and 30B. Thus, each cam follower 26 rotates about the rotation shaft 23 to change the positional relationship between the rotation center of the cam follower 26 and the rotation shaft 23, and to rotate the fin holder 22. Thus, the cam follower 26 rotates the fin 3 held by the fin holder 22 to change the angle of the fin 3 with respect to the drums 20A and 20B.

A torsion spring 24 is wound around each rotation shaft 23. The torsion spring 24 has a first end fixed to the drum 20A or 20B, and a second end fixed to the fin holder 22. The torsion springs 24 urge the plate surface of the fin holder 22 in the radial direction of the drums 20A and 20B. The torsion springs 24 maintain the plate surface of the fin holder 22 extending in the radial direction of the drums 20A and 20B. The torsion springs 24 urge the fin holder 22 to allow the cam followers 26 to be constantly in contact with the cam members 30A and 30B via the rotation shafts 23.

As shown in FIG. 6, the cam members 30A and 30B are respectively arranged for the drums 20A and 20B. As shown in FIG. 7, the cam members 30A and 30B each include a disk having a smaller diameter than the drums 20A and 20B when viewed in Z-direction, and a cam protrusion 31 that protrudes in the negative Y-direction from the outermost edge of the disk in the negative Y-direction.

Each cam protrusion 31 rolls the corresponding cam follower 26 to rotate the fin holder 22 about the corresponding rotation shaft 23. To cause the cam follower 26 to roll over a protrusion end E shown in FIG. 7, the cam protrusion 31 moves the cam follower 26 toward the outer periphery of the cam member 30A from the rotation shafts 23 to rotate the plate 25 counterclockwise about the rotation shafts 23. Thus, the cam protrusion 31 rotates the fin holder 22 counterclockwise. Counterclockwise herein is defined as the cam member 30A is viewed in the negative Z-direction. Counterclockwise or clockwise defined as the cam member 30A or the drum 20A is viewed in the negative Z-direction is hereafter simply referred to as counterclockwise or clockwise.

As shown in FIG. 6, a camshaft 32 extending in Z-direction is attached to each of the cam members 30A and 30B to support the cam members 30A and 30B. The camshaft 32 is coupled to a cam mover (not shown).

The cam mover is a moving mechanism to move the camshaft 32 in Z-direction to change the state of the cam follower 26 in contact with the cam protrusion 31. The cam mover moves the camshaft 32 in Z-direction to change the rotation amount of the cam follower 26, for example, the rotation speed or the rotation angle, to finally change the rotation amount of the fin holder 22. The cam mover includes, for example, a servomotor, a linear guide, and a ball screw, or a linear guide and an air cylinder.

As shown in FIG. 7, the flat tube positioner 41 is arranged on the side of the movable stage 40 in the positive Y-direction to restrict the flat tubes 2 extending in X-direction. Although not shown, the flat tube positioner 41 includes a bottom plate and pins protruding in the positive Y-direction from the bottom plate to restrict the flat tubes 2 into an arrangement in the heat exchanger 1 to be manufactured. The flat tube positioner 41 restricts the flat tubes 2 on the side of the movable stage 40 in the positive Y-direction to have a cross section perpendicular to the axes of the flat tubes 2 having the longitudinal direction parallel to Y-axis.

The movable stage 40 is a moving mechanism to move the flat tubes 2 attached to the stage. The movable stage 40 holds, for example, both ends of the flat tube 2 in the axial longitudinal direction. The movable stage 40 also includes a moving device that moves stage components, such as a linear guide and an air cylinder, or a linear guide and a motor to be movable in X- and Y-directions. The movable stage 40 moves in X-direction by an appropriate distance to move the flat tubes 2 to an appropriate position in X-direction. The movable stage 40 and the flat tube positioner 41 move to intended positions in Y-direction to adjust the positions of the edges of the flat tubes 2 in the positive Y-direction with respect to the fin holder 22.

The operation of the apparatus 10A will now be described with reference to FIG. 7.

The apparatus described below uses the fins 3 preliminary pressed into the shape described in Embodiment 1. The apparatus also uses the flat tubes 2 cut to have an intended length, having the axes parallel to X-direction, and being restricted by the flat tube positioner 41 while having the cross section perpendicular to the axes of the flat tubes 2 with the longitudinal direction in Y-direction. The position of the cam member 30A in FIG. 7 is hereafter referred to as a reference position.

In the apparatus 10A, the drum 20A first rotates in R-direction to feed, at the fin holding position 200 shown in FIG. 7, a fin 3 to the fin holder 22 reaching the fin holding position 200. For example, a transport device including a robot or a linear guide and a motor transports a fin 3 to the fin holder 22. The fin holder 22 sucks and holds the transported fin 3.

Subsequently, the fin holder 22 holding the fin 3 moves to the fin attaching position 210 as the drum 20A rotates in R-direction. At the fin attaching position 210, the fin slits 3A in the fin 3 held by the fin holder 22 are fitted to the flat tubes 2 restricted by the flat tube positioner 41 to attach the fin 3 to the flat tubes 2. After the fin 3 is attached to the flat tubes 2, the fin holder 22 stops sucking the fin 3 and releases the fin 3. This step is the attachment step described above.

After one fin holder 22 attaches the fin 3 to the flat tubes 2, the cam follower 26 coupled to the fin holder 22 comes in contact with the cam protrusion 31 on the cam member 30A. Thus, the cam follower 26 rolls over the cam protrusion 31. The cam follower 26 is thus located in the negative Y-direction of the rotation shaft 23. The fin holder 22 rotates counterclockwise. The fin holder 22 thus moves away from the fin 3 attached to the flat tubes 2. The fin holder 22 does not interfere with the flat tubes 2 and the fin 3 attached to the flat tubes 2.

Subsequently, the moving device for the movable stage 40 moves the movable stage 40 in the positive X-direction by the pitch between the fins 3 in the heat exchanger 1 to be manufactured.

Thereafter, the drum 20A rotates in R-direction, another fin holder 22 reaches the fin attaching position 210, and the fin 3 to be attached is subsequently attached to the flat tubes 2. The movable stage 40 is then moved by the pitch between the fins 3.

The above operation is repeated to attach the fins 3 to the flat tubes 2 to complete the linear heat exchanger 1 described in Embodiment 1.

To attach the fins 3 to the flat tubes 2 at an intended angle with the axes of the flat tubes 2 in the above operation, the position of the cam member 30A is changed. A method for attaching the fins 3 to the flat tubes 2 at an intended angle will now be described with reference to FIG. 8. The drums 20A and 20B and the cam members 30A and 30B shown in FIGS. 6 and 7 have the same structures except the positions, and thus are simply given the reference numerals 20 and 30 in FIG. 8. The same applies to FIGS. 9 to 13.

Figure 8:
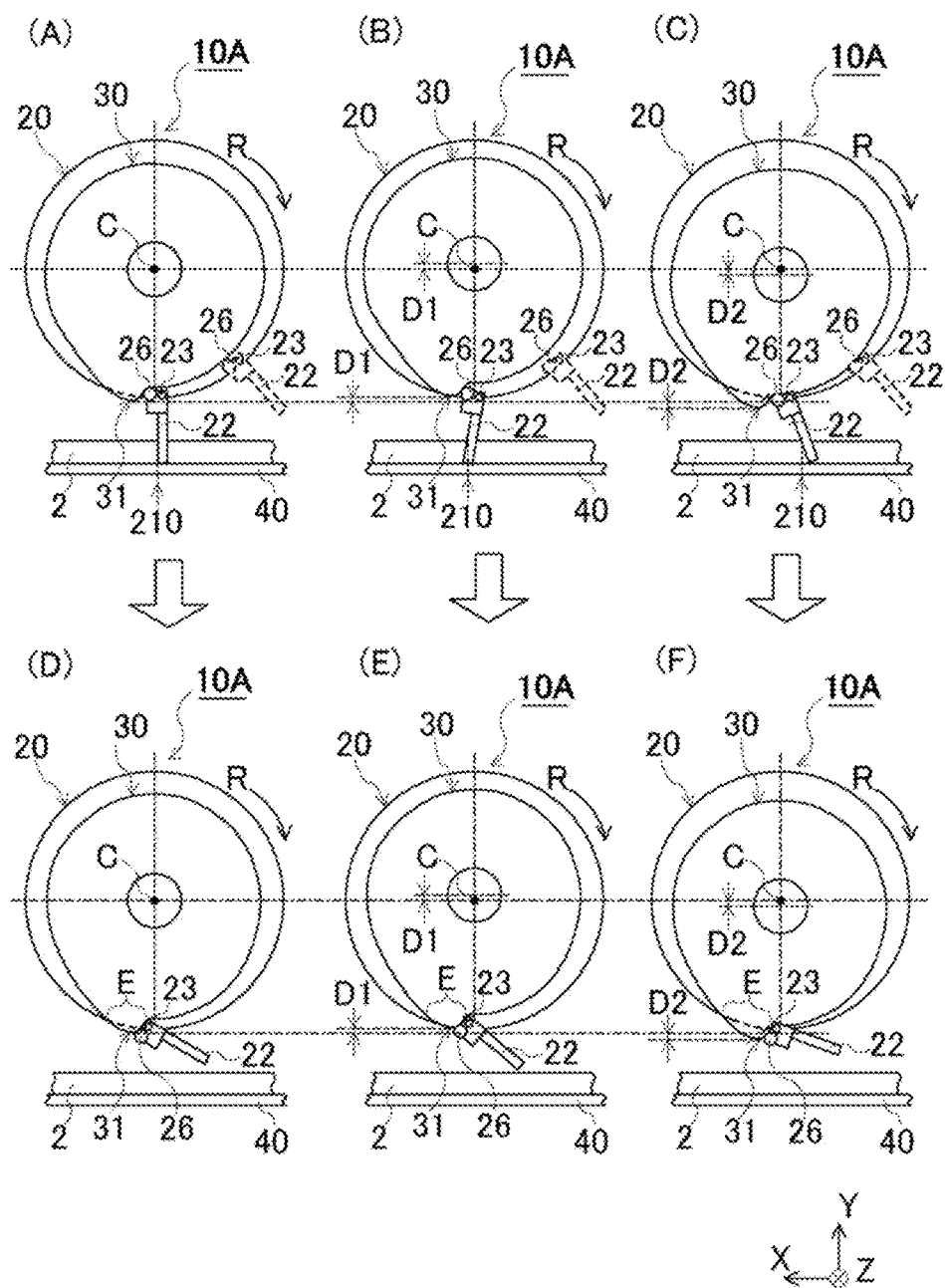
FIG. 8 illustrates the apparatus according to Embodiment 2: (A) is a side view of a fin holder at a position to attach the fin to the flat tubes in the apparatus according to Embodiment 2; (D) is a side view of the fin holder with the drum rotated in R-direction from the position in (A); (B) is a side view of the fin holder at the position to attach the fin to the flat tubes with a cam member moved in a positive Y-direction in the apparatus according to Embodiment 2; (E) is a side view of the fin holder with the drum rotated in R-direction from the position in (B); (C) is a side view of the fin holder at the position to attach the fin to the flat tubes with the cam member moved in a negative Y-direction in the apparatus according to Embodiment 2; and (F) is a side view of the fin holder with the drum rotated in R-direction from the position in (C)
Figure 9:
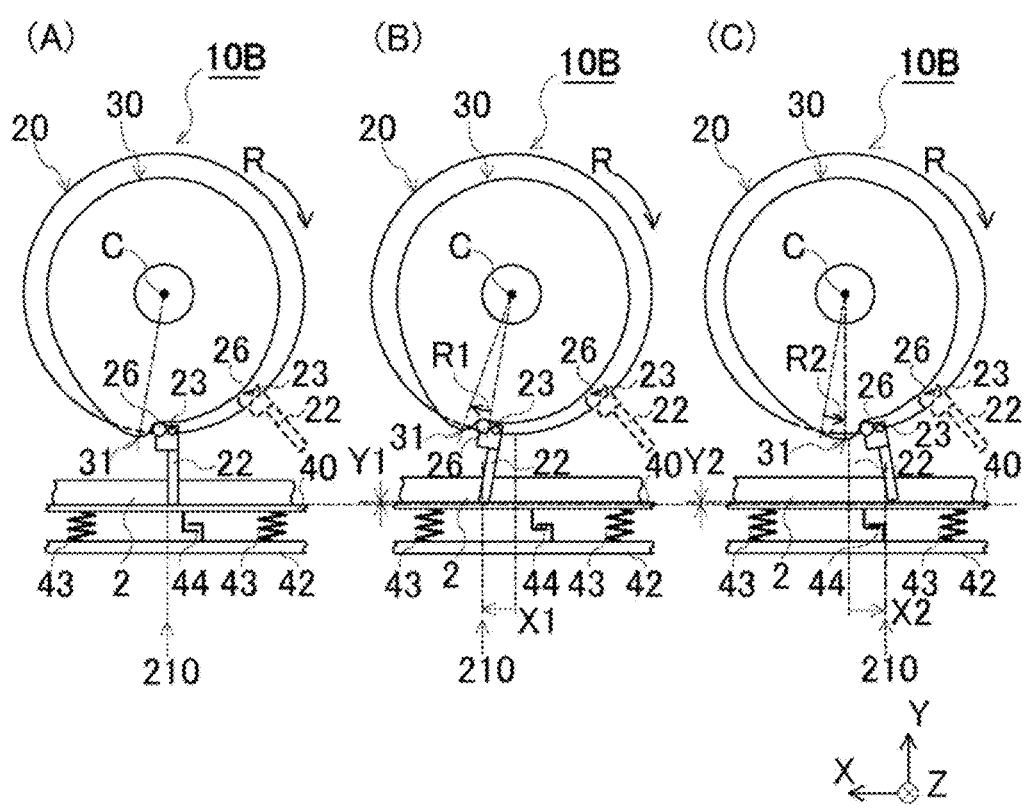
FIG. 9 illustrates an apparatus for manufacturing a heat exchanger according to Embodiment 3: (A) is a side view of a fin holder at a position to attach the fin to the flat tubes in the apparatus according to Embodiment 3; (B) is a side view of the fin holder at the position to attach the fin to the flat tubes with a cam member rotated in R1-direction in the apparatus according to Embodiment 3, and (C) is a side view of the fin holder at the position to attach the fin to the flat tubes with the cam member rotated in R2-direction in the apparatus according to Embodiment 3.
Figure 10:
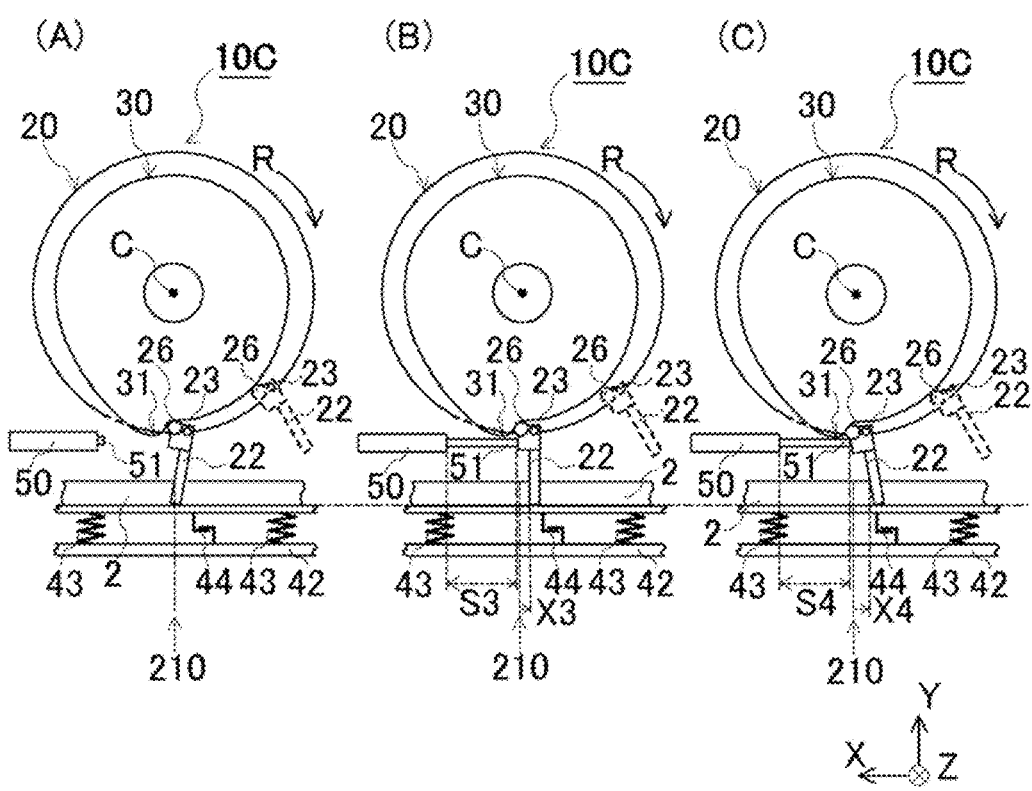
FIG. 10 illustrates an apparatus for manufacturing a heat exchanger according to Embodiment 4: (A) is a side view of the fin holder at a position to attach the fin to the flat tubes with a rod of a rotation controller away from a cam follower in the apparatus according to Embodiment 4; (B) is a side view of the fin holder at the position to attach the fin to the flat tubes with the rod of the rotation controller extended by a length S3 in the apparatus according to Embodiment 4; and (C) is a side view of the fin holder at the position to attach the fin to the flat tubes with the rod of the rotation controller extended by a length S4 in the apparatus according to Embodiment 4.
Figure 11:
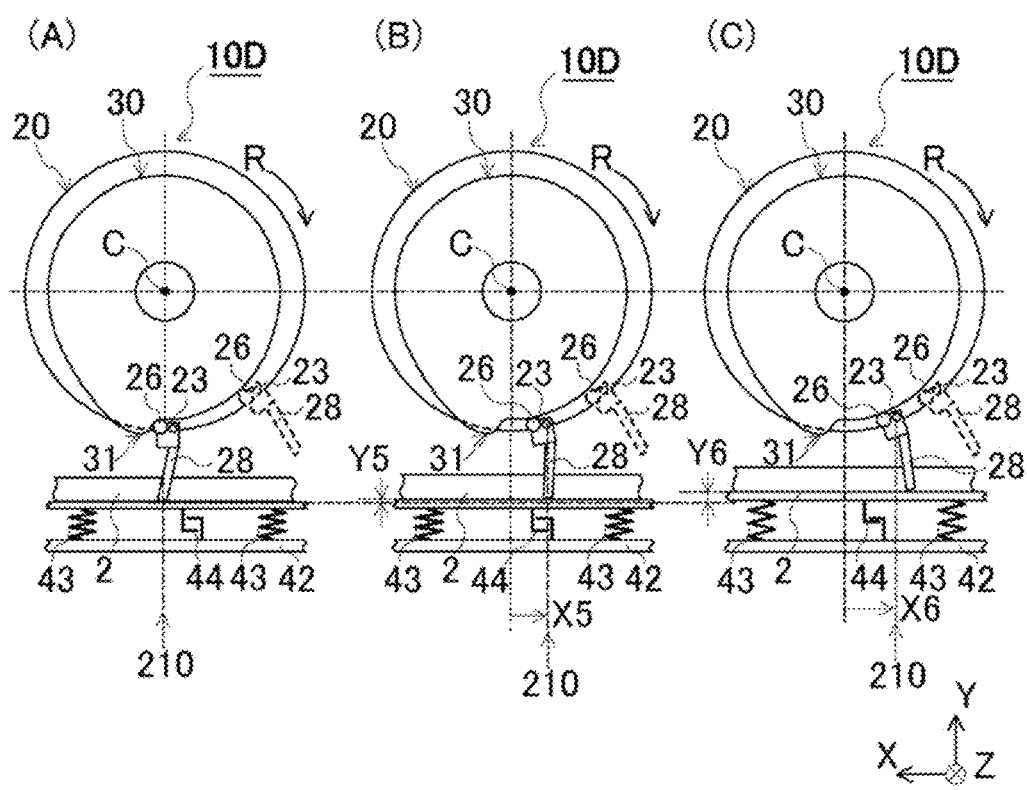
FIG. 11 illustrates an apparatus for manufacturing a heat exchanger according to Embodiment 5: (A) is a side view of the fin holder at a position to attach the fin to the flat tubes in the apparatus according to Embodiment 5; (B) is a side view of the fin holder at the position to attach the fin to the flat tubes by a distance X5 away from the position at which the fin is attached to the flat tubes shown in (A); and (C) is a side view of the fin holder at the position to attach the fin to the flat tubes by a distance X6 away from the position at which the fin is attached to the flat tubes shown in (A)
Figure 12:
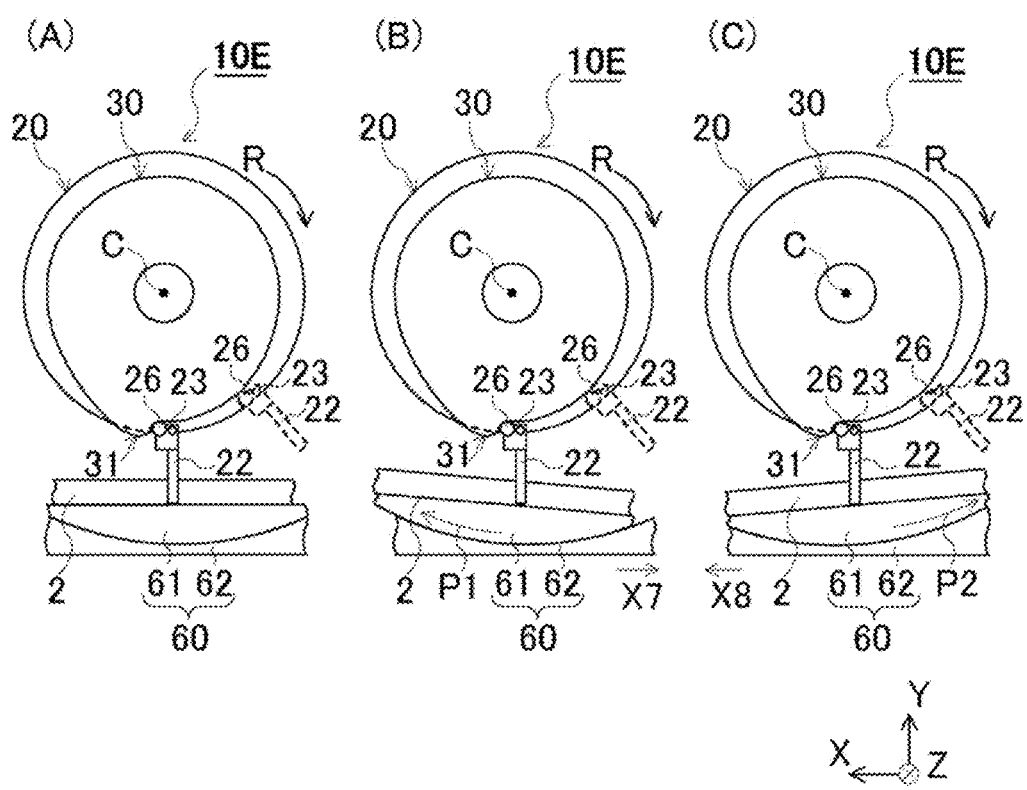
FIG. 12 illustrates an apparatus for manufacturing a heat exchanger according to Embodiment 6: (A) is a side view of the fin holder at a position to attach the fin to the flat tubes with an inclined stage at a horizontal position in the apparatus according to Embodiment 6; (B) is a side view of the fin holder at the position to attach the fin to the flat tubes with the inclined stage rotated in P1-direction in the apparatus according to Embodiment 6; and (C) is a side view of the fin holder at the position to attach the fin to the flat tubes with the inclined stage rotated in P2-direction in the apparatus according to Embodiment 6.
Figure 13:
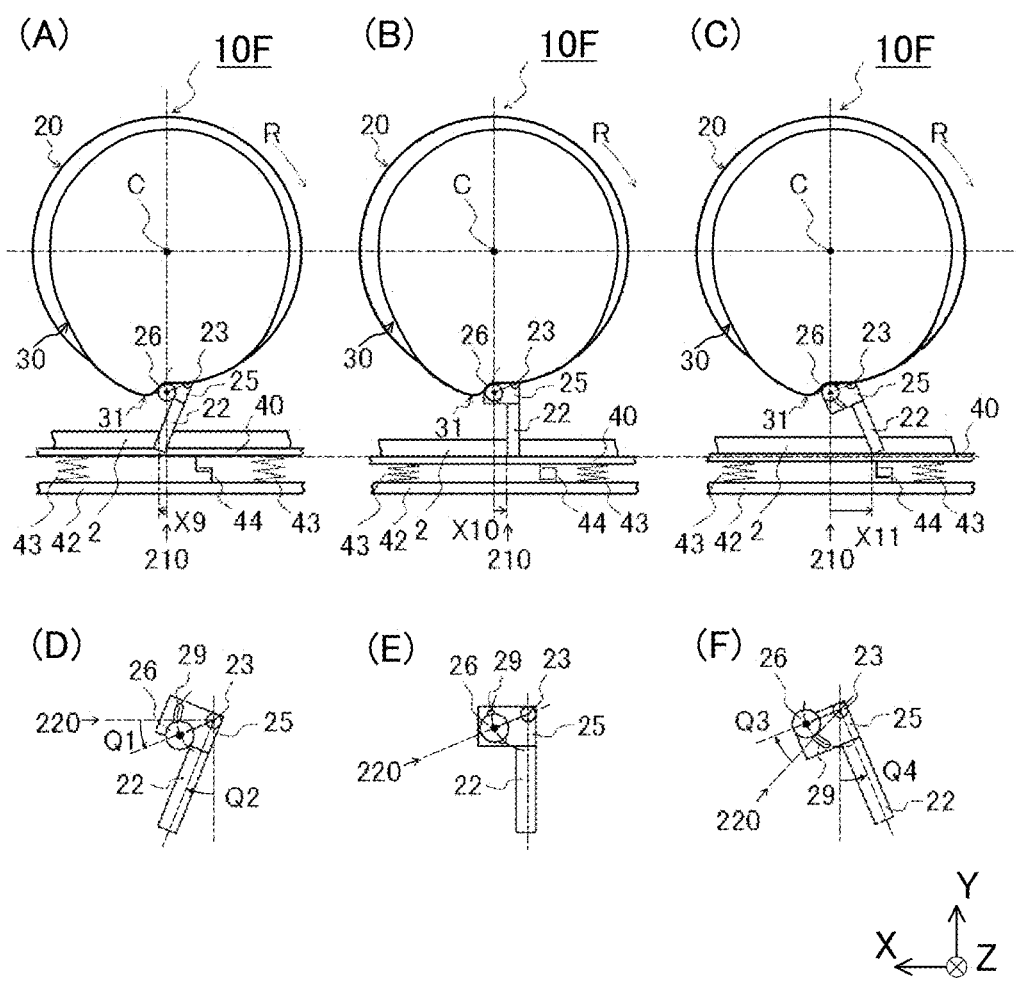
FIG. 13 illustrates an apparatus for manufacturing a heat exchanger according to Embodiment 7: (A) is a side view of the fin holder at a position to attach the fin to the flat tubes with a cam follower moved by a cam-follower mover in the negative Y-direction from the reference position in the apparatus according to Embodiment 7; (D) is an enlarged side view of the fin holder shown in (A); (B) is a side view of the fin holder at the position to attach the fin to the flat tubes with the cam follower moved by the cam-follower mover to the reference position in the apparatus according to Embodiment 7; (E) is an enlarged side view of the fin holder shown in (B); (C) is a side view of the fin holder at the position to attach the fin to the flat tubes with the cam follower moved by a cam-follower mover in the positive Y-direction from the reference position in the apparatus according to Embodiment 7, and (F) is an enlarged side view of the fin holder shown in (C)

FIG. 8(A) is a side view of the fin holder 22 at a position to attach the fin 3 to the flat tubes 2 in the apparatus 10A according to Embodiment 2. FIG. 8(D) is a side view of the fin holder 22 with the drum 20 rotated in R-direction from the position in FIG. 8(A). FIG. 8(B) is a side view of the fin holder 22 at the position to attach the fin 3 to the flat tubes 2 with the cam member 30 moved in the positive Y-direction in the apparatus 10A according to Embodiment 2. FIG. 8(E) is a side view of the fin holder 22 with the drum 20 rotated in R-direction from the position in FIG. 8(B). FIG. 8(C) is a side view of the fin holder 22 at the position to attach the fin 3 to the flat tubes 2 with the cam member 30 moved in the negative Y-direction in the apparatus 10A according to Embodiment 2. FIG. 8(F) is a side view of the fin holder 22 with the drum 20 rotated in R-direction from the position in FIG. 8(C). For ease of understanding, FIG. 8 simply shows the operation of one fin holder 22.

To attach the fin 3 to the flat tubes 2 perpendicularly to the axes of the flat tubes 2 with the apparatus 10A, as shown in FIG. 8(A), the cam member 30 remains at the reference position in Z-direction. In this case, the fin holder 22 at the fin attaching position 210 remains facing in the radial direction of the drum 20, or in the negative Y-direction. Under this positional relationship, the apparatus 10A fits the fin slits 3A to the flat tubes 2 restricted by the flat tube positioner 41. As described above, the flat tube positioner 41 maintains the axes of the flat tubes 2 extending in X-direction, and the fin 3 oriented perpendicularly to the axes of the flat tubes 2 is attached to the flat tubes 2.

As the cam follower 26 then rolls over the protrusion end E of the cam protrusion 31, the fin holder 22 moves away from the fin 3 attached to the flat tubes 2 as shown in FIG. 8(D). The fin holder 22 does not interfere with the flat tubes 2 and the fin 3 attached to the flat tubes 2.

To attach the fin 3 to the flat tubes 2 with the apparatus 10A while the fin holder 22 is at the fin attaching position 210 and is rotated around the rotation shaft 23 clockwise with respect to the radial direction of the drum 20, the cam mover raises the cam member 30 from the reference position. More specifically, as shown in FIG. 8(B), the apparatus 10A moves the cam member 30 by a distance D1 in the positive Y-direction. When the fin holder 22 reaches the fin attaching position 210, the cam follower 26 is located in the negative Y-direction of the rotation shaft 23. At the fin attaching position 210, the fin holder 22 is rotated clockwise with respect to the radial direction of the drum 20. The fin 3 is also rotated clockwise with respect to the radial direction of the drum 20, and attached to the flat tubes 2 in a manner inclined with respect to the axes of the flat tubes 2.

As shown in FIG. 8(E), the fin holder 22 then moves away from the fin 3 attached to the flat tubes 2. As in the state shown in FIG. 8(D), the flat tubes 2 do not interfere with the fin 3 attached to the flat tubes 2.

To attach the fin 3 to the flat tubes 2 while the fin holder 22 at the fin attaching position 210 is rotated counterclockwise about the rotation shafts 23 with respect to the radial direction of the drum 20, the apparatus 10A lowers the cam member 30 from the reference position with the cam mover. More specifically, as shown in FIG. 8(C), the apparatus 10A moves the cam member 30 from the reference position in the negative Y-direction by a distance D2. When the fin holder 22 reaches the fin attaching position 210, the cam follower 26 is located in the positive Y-direction from the rotation shafts 23. At the fin attaching position 210, the fin holder 22 is rotated counterclockwise with respect to the radial direction of the drum 20. The fin 3 is thus rotated counterclockwise with respect to the radial direction of the drum 20, and attached to the flat tubes 2 in a manner inclined with respect to the axes of the flat tubes 2.

As shown in FIG. 8(F), the fin holder 22 then moves away from the fin 3 attached to the flat tubes 2. As in the state shown in FIGS. 8(D) and (E), the fin holder 22 does not interfere with the flat tubes 2 and the fin 3 attached to the flat tubes 2.

As described above, in the apparatus 10A according to Embodiment 2, the cam mover raises or lowers the cam member 30 to attach the fin 3 to the flat tubes 2 in a manner inclined with respect to the axes of the flat tubes 2. The apparatus 10A thus enables easy manufacture of the heat exchanger 1 according to Embodiment 1 having small airflow resistance and high heat exchange efficiency.

The apparatus 10A can incline the fin 3 in an intended direction by changing the amount by which the cam member 30 is raised or lowered.

Embodiment 3

An apparatus 10B for manufacturing a heat exchanger according to Embodiment 3 rotates the cam member 30 with a cam rotator. The apparatus 10B according to Embodiment 3 will now be described with reference to FIG. 9. Components in Embodiment 3 different from the components described in Embodiment 2 will be described.

FIG. 9(A) is a side view of the fin holder 22 at a position to attach the fin 3 to the flat tubes 2 in the apparatus 10B according to Embodiment 3. FIG. 9(B) is a side view of the fin holder 22 at the position to attach the fin 3 to the flat tubes 2 with a cam member 30 rotated in R1-direction in the apparatus 10B according to Embodiment 3. FIG. 9(C) is a side view of the fin holder 22 at the position to attach the fin 3 to the flat tubes 2 with the cam member 30 rotated in R2-direction in the apparatus 10B according to Embodiment 3.

Although not shown, the apparatus 10B includes a cam rotator that rotates the cam member 30. The cam rotator is a driving device including a servomotor and a coupling member that couples the rotation shaft of the servomotor with the camshaft 32. As shown in FIGS. 9(B) and (C), the cam member 30 is rotatable about the center axis C.

As described later, the position of the fin holder 22 in Y-direction is changed as the cam member 30 rotates. Thus, the position of the fin 3 attached to the flat tubes 2 may be changed in Y-direction. To prevent the fin 3 from being attached at a different position in Y-direction, a position retaining mechanism presses the movable stage 40 and the flat tube positioner 41 against the fin 3 to maintain the positions of the movable stage 40 and the flat tube positioner 41 relative to the fin 3.

More specifically, the movable stage 40 includes a position retaining mechanism that includes a base 42, compression springs 43, and a stopper 44. The base 42 in the negative Y-direction faces the movable stage 40. The compression springs 43 are arranged between the base 42 and the movable stage 40. The stopper 44 retains the movable stage 40 within a fixed distance from the base 42. Although not shown, as in the movable stage 40, the flat tube positioner 41 also includes a position retaining mechanism.

The compression springs 43 are pressing members that press the movable stage 40 against the fin holder 22. The movable stage 40 is pressed by the compression springs 43 in the positive Y-direction, and thus the flat tubes 2 on the side of the movable stage 40 in the positive Y-direction are pressed in the positive Y-direction, or against the fin holder 22.

The stopper 44 includes an inverted-L-shaped hook in an XY plan view on the base 42, and an L-shaped hook in an XY plan view on the movable stage 40. When the base 42 and the movable stage 40 are positioned at a fixed distance from each other, the stopper 44 retains the base 42 and the movable stage 40 at the fixed distance apart with the hooks engaged with each other.

Subsequently, a method according to Embodiment 3 for attaching the fins 3 to the flat tubes 2 at any angle will now be described.

To attach the fins 3 to the flat tubes 2 perpendicularly to the axes of the flat tubes 2, as shown in FIG. 9(A), the apparatus 10B maintains the cam member 30 at the reference position described in Embodiment 2 without rotating the cam member 30 with a cam rotator. This operation is the same as in Embodiment 2, and will not be described.

To attach the fin 3 to the flat tubes 2 in a manner inclined with respect to the axes of the flat tubes 2 in the same direction as in FIG. 8(B) in Embodiment 2, the apparatus 10B rotates the cam member 30 clockwise, or in R1-direction shown in FIG. 9(B) from the reference position with the cam rotator. The apparatus 10B then changes the fin attaching position 210 by a distance X1 from the position shown in FIG. 9(A) in the positive X-direction. Thus, the fin holder 22 reaches the fin attaching position 210 with the drum 20 rotated further in R-direction than in FIG. 9(A). At the fin attaching position 210, the fin 3 is inclined with respect to the axes of the flat tubes 2 in the same direction as in FIG. 8(B) in Embodiment 2, and attached to the flat tubes 2. Thereafter, the apparatus 10B causes the fin holder 22 to stop sucking the fin 3 to release the fin 3, and moves the fin holder 22 away from the fin 3 attached to the flat tubes 2. The fin holder 22 does not interfere with the flat tubes 2 and the fin 3 attached to the flat tubes 2.

To attach the fin 3 to the flat tubes 2 in a manner inclined with respect to the axes of the flat tubes 2 in the same direction as in FIG. 8(C) in Embodiment 2, the apparatus 10B rotates the cam member 30 counterclockwise, or in R2-direction shown in FIG. 9(C) from the reference position with the cam rotator. The apparatus 10B then moves the fin attaching position 210 by a distance X2 from the position shown in FIG. 9(A) in the negative X-direction. Thus, the fin holder 22 reaches the fin attaching position 210 with the drum 20 rotating by a lesser degree in R-direction than in FIG. 9(A). At the fin attaching position 210, the fin 3 is inclined with respect to the axes of the flat tubes 2 in the same direction as in FIG. 8(C) in Embodiment 2, and attached to the flat tubes 2. Thereafter, the apparatus 10B stops sucking the fin 3 and moves the fin holder 22 in the same manner as in FIG. 9(B).

As shown in FIG. 9(A) to (C), after the apparatus 10B rotates the cam member 30 in R1- or R2-direction, the leading edge of the fin holder 22 in the negative Y-direction moves in Y-direction from the reference position by a distance Y1 or Y2. However, the above compression springs 43 pressing the movable stage 40 in the positive Y-direction maintain the positional relationship between the fin holder 22 and the movable stage 40 in the same state as in Embodiment 2.

When the apparatus 10B rotates the cam member 30 in R1- or R2-direction, the fin attaching position 210 is changed from the reference position by the distance X1 or X2. Thus, in Embodiment 3, the apparatus 10B moves the movable stage 40 by a distance smaller by the distance X1 or greater by the distance X2 than the pitch between the fins 3 in the heat exchanger 1 to be manufactured. Thus, the fin 3 may be attached to the flat tubes 2 with an intended pitch.

In Embodiment 3, the cam protrusion 31 moved in the positive X- or negative X-direction may cause the fin holder 22 to interfere with the fin 3 attached to the flat tubes 2. In this case, the apparatus 10B may move the movable stage 40 in the negative X- or positive X-direction to prevent such interference.

As described above, the apparatus 10B according to Embodiment 3 can attach the fin 3 to the flat tubes 2 in a manner inclined with respect to the axes of the flat tubes 2 with the cam rotator rotating the cam member 30. The fin 3 can be inclined in an intended direction by changing the rotation direction and the rotation amount of the cam member 30.

Embodiment 4

An apparatus 10C for manufacturing a heat exchanger according to Embodiment 4 includes a rotation controller that comes in contact with the fin holder 22 at the fin attaching position 210 to rotate the fin holder 22. The structure of the apparatus 10C according to Embodiment 4 will now be described with reference to FIG. 10. Components in Embodiment 4 different from the components described in Embodiments 2 and 3 will be described.

FIG. 10(A) is a side view of the fin holder 22 at a position to attach the fin 3 to the flat tubes 2 with a rod 51 of a rotation controller 50 away from a cam follower in the apparatus 10C according to Embodiment 4. FIG. 10(B) is a side view of the fin holder 22 at the position to attach the fin 3 to the flat tubes 2 with the rod 51 of the rotation controller 50 extended by a length S3 in the apparatus 10C according to Embodiment 4. FIG. 10(C) is a side view of the fin holder 22 at the position to attach the fin 3 to the flat tubes 2 with the rod 51 of the rotation controller 50 extended by a length S4 in the apparatus 10C according to Embodiment 4.

As shown in FIG. 10(A) to (C), the apparatus 10C includes the rotation controller 50 located in the positive X-direction in the edge of the drum 20 in the negative Y-direction. The rotation controller 50 includes the rod 51 retractable into and extensible from a housing. The rod 51 is extensible to the fin holder 22 at the fin attaching position 210 and to the position at which the rod 51 can press the fin holder 22 to rotate.

The apparatus 10C differs from the apparatus 10A according to Embodiment 2 in including the above rotation controller 50. The apparatus 10C at the position shown in FIG. 10(A) rotates the fin holder 22 clockwise about the rotation shafts 23 unlike the apparatus 10A according to Embodiment 2 at the position shown in FIG. 8(A) allowing the fin holder 22 to extend perpendicularly to the axes of the flat tubes 2. Thus, the fin holder 22 is inclined with respect to the axes of the flat tubes 2.

A method according to Embodiment 4 for attaching the fin 3 to the flat tubes 2 at any angle will now be described.

To attach the fin 3 to the flat tubes 2 while the fin holder 22 at the fin attaching position 210 is rotated clockwise about the rotation shafts 23 with respect to the radial direction of the drum 20, the apparatus 10C maintains the rod 51 retracted in the housing of the rotation controller 50 without being extended, as shown in FIG. 10(A). Here, the fin holder 22 remains inclined with respect to the axes of the flat tubes 2 as described above. With the fin holder 22 in this state to be at the fin attaching position 210, the apparatus 10C attaches the fin 3 to the flat tubes 2. The fin 3 is thus attached to the flat tubes 2 with the fin holder 22 remaining inclined. The apparatus 10C then causes the fin holder 22 to stop sucking the fin 3 to release the fin 3. To prevent interference with the flat tubes 2 and the fin 3, the apparatus 10C moves the fin holder 22 away from the fin 3 attached to the flat tubes 2.

To attach the fin 3 perpendicularly to the axes of the flat tubes 2, as shown in FIG. 10(B), the apparatus 10C extends the rod 51 by the length S3 to restrict the rotation range of the fin holder 22 at the fin attaching position 210 to prevent the cam follower 26 from touching the cam protrusion 31. Here, the length S3 allows the distal end of the rod 51 to come in contact with the plate 25 without the cam follower 26 touching the cam protrusion 31. Thus, the fin holder 22 remains facing in Y-direction. With the rod 51 being extended by the length S3 by the apparatus 10C, the fin 3 is attached to the flat tubes 2 with the fin holder 22 perpendicular to the axes of the flat tubes 2. After the fin 3 is attached, the apparatus 10C stops sucking the fin 3 and moves the fin holder 22 as in FIG. 10(A).

To attach the fin 3 to the flat tubes 2 while the fin holder 22 at the fin attaching position 210 is rotated counterclockwise about the rotation shafts 23 with respect to the radial direction of the drum 20, as shown in FIG. 10(C), the apparatus 10C extends the rod 51 by the length S4 to restrict the rotation range of the fin holder 22 at the fin attaching position 210 to prevent the cam follower 26 from touching the cam protrusion 31. In this case, the apparatus 10C rotates the fin holder 22 counterclockwise about the rotation shafts 23 with respect to the radial direction of the drum 20 by the length S4 greater than the length Si shown in FIG. 10(B). The fin holder 22 in this state attaches the fin 3 to the flat tubes 2 while the fin 3 is rotated counterclockwise and inclined. After the fin 3 is attached, the apparatus 10C stops sucking the fin 3 and moves the fin holder 22 in the same manner as in FIGS. 10(A) and (B).

As shown in FIG. 10(A) to (C), when the apparatus 10C extends the rod 51 to press the rod 51 against the fin holder 22, the fin holder 22 moves to shift the fin 3 by the distance X3 in FIG. 10(B) or by the distance X4 in FIG. 10(C). Thus, the movable stage 40 may be moved in the positive X-direction by the distance X3 or X4 greater than the pitch between the fins 3 to be used in the heat exchanger 1 to be manufactured. The fins 3 may be attached to the flat tubes 2 with an intended pitch.

As described above, the apparatus 10C according to Embodiment 4 extends the rod 51 of the rotation controller 50 to attach the fins 3 to the flat tubes 2 perpendicularly to or in a manner inclined with respect to the axes of the flat tubes 2. The fins 3 may be inclined in an intended direction in accordance with the extended amount of the rod 51.

Embodiment 5

In an apparatus 10D for manufacturing a heat exchanger according to Embodiment 5, a fin holder 28 is inclined with respect to the radial direction of the drum 20. The structure of the apparatus 10D according to Embodiment 5 will now be described with reference to FIG. 11. Components in Embodiment 5 different from the components described in Embodiments 2 to 4 will be described.

FIG. 11(A) is a side view of the fin holder 28 at a position to attach the fin 3 to the flat tubes 2 in the apparatus 10D according to Embodiment 5. FIG. 11(B) is a side view of the fin holder 28 at the position to attach the fin 3 to the flat tubes 2 by a distance X5 away from the position at which the fin 3 is attached to the flat tubes 2 shown in FIG. 11(A). FIG. 11(C) is a side view of the fin holder 28 at the position to attach the fin 3 to the flat tubes 2 by a distance X6 away from the position at which the fin 3 is attached to the flat tubes 2 shown in FIG. 11(A).

As shown in FIG. 11(A) to (C), the fin holder 28 is parallelogrammatic in an XY cross-sectional view. Two side walls of the fin holder 28 located in Y-direction in an XY cross-sectional view are inclined in the rotation direction, or R-direction of the drum 20 with respect to the outer periphery of the drum 20. Thus, the fin 3 in the fin holder 28 is inclined clockwise with respect to the radial direction of the drum 20 in the same manner as described in FIG. 8(B) in Embodiment 2, and thus inclined with respect to the axes of the flat tubes 2.

A method according to Embodiment 5 for attaching the fin 3 to the flat tubes 2 at any angle will now be described.

To attach the fin 3 rotated clockwise and inclined with respect to the direction perpendicular to the axes of the flat tubes 2 to the flat tubes 2 with the apparatus 10D, the fin attaching position 210 is the position at which the cam follower 26 is in contact with the cam protrusion 31 as shown in FIG. 11(A). At the fin attaching position 210, the fin 3 is inclined clockwise with respect to the axes of the flat tubes 2 as described above. At this position, the apparatus 10D attaches the fin 3 to the flat tubes 2, with the fin 3 such inclined. After attaching the fin 3, the apparatus 10D causes the fin holder 28 to stop sucking the fin 3, and moves the fin holder 28 away from the fin 3 attached to the flat tubes 2 to prevent interference with the flat tubes 2 and the fin 3.

To attach the fin 3 to the flat tubes 2 parallel to Y-axis or perpendicularly to the axes of the flat tubes 2 with the apparatus 10D, the fin attaching position 210 is the position of the rotation shafts 23 away from the outermost edge of the drum 20 in the negative Y-direction by the distance X5 as shown in FIG. 11(B). At this fin attaching position 210, the drum 20 rotates by a lesser degree in R-direction than in FIG. 11(A), and the fin holder 28 is parallel to Y-axis, or in other words, perpendicular to the axes of the flat tubes 2. At this fin attaching position 210, the apparatus 10D attaches the fin 3 extending perpendicularly to the axes of the flat tubes 2 to the flat tubes 2. After attaching the fin 3, the apparatus 10D causes the fin holder 28 to stop sucking the fin 3 and moves the fin holder 28 in the same manner as described above.

To attach the fin 3 rotated counterclockwise and inclined with respect to the direction perpendicular to the axes of the flat tubes 2 to the flat tubes 2 with the apparatus 10D, the fin attaching position 210 is the position of the rotation shafts 23 away from the outermost edge of the drum 20 in the negative Y-direction by the distance X6 as shown in FIG. 11(C). The distance X6 is greater than the distance X5. At the fin attaching position 210, the drum 20 rotates by a lesser degree in R-direction than in FIG. 11(B), and the fin holder 28 is inclined with respect to the axes of the flat tubes 2 in the direction opposite to the direction in FIG. 11(A). At this fin attaching position 210, the apparatus 10D thus attaches the fin 3 rotated counterclockwise and inclined with respect to the direction perpendicular to the axes of the flat tubes 2 to the flat tubes 2. The apparatus 10D then stops sucking the fin 3 and moves the fin holder 28 in the same manner as in FIGS. 11(A) and (B).

In Embodiment 5, the fin holder 28 is shifted in the negative X-direction from the reference position in the same manner as in Embodiments 3 and 4. The apparatus 10D may move the movable stage 40 in the positive X-direction by a distance greater by the shift than the pitch between the fins 3 in the heat exchanger 1 to be manufactured.

As shown in FIG. 11(A) to (C), the leading edge of the fin holder 28 in the negative Y-direction moves in Y-direction by a distance Y5 in FIG. 10(B), or by a distance Y6 in FIG. 10(C). However, this movement is adjusted by the compression springs 43. The positional relationship between the fin holder 28 and the movable stage 40 thus remains unchanged from the relationship achieved in Embodiments 2 to 4.

In the apparatus 10D according to Embodiment 5 described above, the fin holder 28 is inclined in the rotation direction, or R-direction of the drum 20 with respect to the outer periphery of the drum 20, and thus the fin 3 can easily be inclined. The fin 3 can also be inclined in an intended direction by changing the fin attaching position 210.

Embodiment 6

An apparatus 10E for manufacturing a heat exchanger according to Embodiment 6 includes an inclined stage 60. The structure of the apparatus 10E according to Embodiment 6 will now be described with reference to FIG. 12. Components in Embodiment 6 different from the components described in Embodiments 2 to 5 will be described.

FIG. 12(A) is a side view of the fin holder 22 at a position to attach the fin 3 to the flat tubes 2 with the inclined stage 60 at a parallel position in the apparatus 10E according to Embodiment 6. FIG. 12(B) is a side view of the fin holder 22 at the position to attach the fin 3 to the flat tubes 2 with the inclined stage 60 rotated in P1-direction in the apparatus 10E according to Embodiment 6. FIG. 12(C) is a side view of the fin holder 22 at the position to attach the fin 3 to the flat tubes 2 with the inclined stage 60 rotated in P2-direction in the apparatus 10E according to Embodiment 6.

As shown in FIG. 12(A) to (C), the apparatus 10E includes the inclined stage 60 having a stage surface inclined with respect to the fin holder 22 at the fin attaching position 210. The inclined stage 60 includes an inclination mechanism including a base 62 and a table 61. The base 62 is concave in the negative Y-direction in the XY cross section. The table 61 is convex in the negative Y-direction in the XY cross section. In the inclined stage 60, the convex part of the table 61 in the XY cross-sectional view moves along the concave part of the base 62 in the XY cross-sectional view to allow the stage surface located in the positive Y-direction from the table 61 to extend parallel to X-axis or to be inclined with respect to X-axis. Although not shown, the flat tube positioner 41 extends parallel to X-axis or inclined with respect to X-axis in the same manner as in the inclined stage 60.

A method according to Embodiment 6 for attaching the fin 3 to the flat tubes 2 at any angle will now be described.

To attach the fin 3 to the flat tubes 2 perpendicularly to the axes of the flat tubes 2, the apparatus 10E retains the stage surface of the inclined stage 60 parallel to X-axis as shown in FIG. 12(A). Thus, the apparatus 10E maintains the fin holder 22 to be perpendicular to the flat tubes 2. In this state, the apparatus 10E attaches the fin 3 to the flat tubes 2. The fin 3 is thus attached to the flat tubes 2 perpendicularly to the axes of the flat tubes 2.

To attach the fin 3 to the flat tubes 2 with the fin 3 inclined with respect to the axes of the flat tubes 2 in the same direction as in FIG. 8(C) in Embodiment 2, the apparatus 10E rotates the table 61 in P1-direction along the concave on the base 62 in an XY cross-sectional view as shown in FIG. 12(B). The apparatus 10E attaches the fin 3 to the flat tubes 2 in this state. The fin 3 is thus attached to the flat tubes 2 in a manner inclined with respect to the axes of the flat tubes 2 in the same direction as in FIG. 8(C) in Embodiment 2.

To attach the fin 3 to the flat tubes 2 with the fin 3 inclined with respect to the axes of the flat tubes 2 in the same direction as in the FIG. 8(B) in Embodiment 2, the apparatus 10E rotates the table 61 in the direction opposite to P1-direction, that is, in P2-direction along the concave on the base 62 in the XY cross-sectional view as shown in FIG. 12(C). The fin 3 is attached to the flat tubes 2 in this state. The fin 3 is thus attached to the flat tubes 2 in a manner inclined with respect to the axes of the flat tubes 2 in the same direction as in FIG. 8(B) in Embodiment 2.

In Embodiment 6, the flat tubes 2 on the stage surface and the fin 3 attached to the flat tubes 2 may interfere with the fin holder 22 depending on the direction in which the stage surface of the inclined stage 60 is inclined. Here, the apparatus 10E may place the stage surface of the inclined stage 60 horizontal to prevent interference. Also, the fin holder 22 may be shifted from the flat tubes 2 on the stage surface depending on the direction in which the stage surface of the inclined stage 60 is inclined. For example, the fin holder 22 is shifted by a distance X7 in FIG. 12(B) or a distance X8 in FIG. 12(C) from the position in FIG. 12(A). In this case, the apparatus 10E may move the inclined stage 60 to adjust the relative position.

As described above, the apparatus 10E according to Embodiment 6 including the inclined stage 60 can place the flat tubes 2 at the position perpendicular to the fin 3 held by the fin holder 22 or at a position inclined in an intended direction. The fin 3 can thus be oriented in an intended direction with respect to the axes of the flat tubes 2.

Embodiment 7

An apparatus 10F for manufacturing a heat exchanger according to Embodiment 7 includes a cam-follower mover that moves the cam follower 26. The structure of the apparatus 10F according to Embodiment 7 will now be described with reference to FIG. 13. Components in Embodiment 7 different from the components described in Embodiments 2 to 6 will be described.

FIG. 13(A) is a side view of the fin holder 22 at a position to attach the fin 3 to the flat tubes 2 with the cam follower 26 moved by the cam-follower mover in the negative Y-direction from the reference position in the apparatus 10F according to Embodiment 7. FIG. 13(D) is an enlarged side view of the fin holder 22 shown in FIG. 13(A). FIG. 13(B) is a side view of the fin holder 22 at the position to attach the fin 3 to the flat tubes 2 with the cam follower 26 moved by the cam-follower mover to the reference position in the apparatus 10F according to Embodiment 7. FIG. 13(E) is an enlarged side view of the fin holder 22 shown in FIG. 13(B). FIG. 13(C) is a side view of the fin holder 22 at the position to attach the fin 3 to the flat tubes 2 with the cam follower 26 moved by the cam-follower mover in the positive Y-direction from the reference position in the apparatus 10F according to Embodiment 7. FIG. 13(F) is an enlarged side view of the fin holder 22 shown in FIG. 13(C). The reference position refers to the position at which the center shaft of the cam follower 26 is on a straight line 220. As shown in FIG. 13(D) to (F), the plate 25 attached to the fin holder 22 has a long groove 29 shaped in an arc with a center at the rotation shaft 23. The long groove 29 has a width slightly larger than the diameter of the center shaft of the cam follower 26. The center shaft of the cam follower 26 is loosely received in the long groove 29. The cam follower 26 can thus move along the long groove 29.

Although not shown, the fin holder 22 includes a moving mechanism that moves the center shaft of the cam follower 26. The moving mechanism includes a piston that rotatably holds the center shaft of the cam follower 26, and an electric or air cylinder that translates the piston.

In the apparatus 10F, the long groove 29 and the moving mechanism on the fin holder 22 form the cam-follower mover. In the cam-follower mover, the moving mechanism moves the center shaft of the cam follower 26 along the long groove 29. The cam-follower mover moves the center shaft of the cam follower 26 to change the amount by which the fin holder 22 rotates in response to the cam follower 26 coming in contact with the cam member 30.

In the apparatus 10F, as shown in FIGS. 13(B) and (E), the fin holder 22 faces in the radial direction of the drum 20, that is, in the negative Y-direction when the center shaft of the cam follower 26 is on the straight line 220 connecting the center of the rotation shaft 23 to the center of the long groove 29 in the XY plane, or in other words, to the center of the groove length and the center of the groove width.

A method according to Embodiment 7 for attaching the fin 3 to the flat tubes 2 at any angle will now be described.

To attach the fin 3 to the flat tubes 2 while the fin holder 22 at the fin attaching position 210 is rotated clockwise about the rotation shafts 23 with respect to the radial direction of the drum 20, the apparatus 10F at the fin attaching position 210 moves the center shaft of the cam follower 26 from the reference position along the long groove 29 in Q1-direction as shown in FIG. 13(D). Here, the fin holder 22 in the negative Y-direction is rotated about the rotation shafts 23 in Q2-direction, or in other words, rotated clockwise with respect to the radial direction of the drum 20 shown in FIG. 13(A). The fin holder 22 attaches the fin 3 to the flat tubes 2 in this state. Thus, the fin 3 inclined with respect to the axes of the flat tubes 2 in the same direction as in FIG. 8(B) in Embodiment 2 is attached to the flat tubes 2. The apparatus 10F then causes the fin holder 22 to stop sucking the fin 3 to release the fin 3. The apparatus 10F also moves the fin holder 22 away from the fin 3 attached to the flat tubes 2 to prevent the fin holder 22 from interfering with the flat tubes 2 and the fin 3.

To attach the fin 3 perpendicularly to the axes of the flat tubes 2, the apparatus 10F moves the center shaft of the cam follower 26 to the reference position while the fin holder 22 is at the fin attaching position 210 as shown in FIG. 13(E). Thus, the fin holder 22 faces in Y-direction as shown in FIG. 13(B). The fin holder 22 in this state attaches the fin 3 to the flat tubes 2 perpendicularly to the axes of the flat tubes 2. The apparatus 10F then causes the fin holder 22 to stop sucking the fin 3 and moves the fin holder 22.

To attach the fin 3 to the flat tubes 2 while the fin holder 22 at the fin attaching position 210 is rotated counterclockwise about the rotation shafts 23 with respect to the radial direction of the drum 20, the apparatus 10F at the fin attaching position 210 moves the center shaft of the cam follower 26 from the reference position in Q3-direction along the long groove 29 as shown in FIG. 13(F). Thus, the fin holder 22 at the fin attaching position 210 in the negative Y-direction is rotated about the rotation shafts 23 in Q4-direction, that is, rotated counterclockwise with respect to the radial direction of the drum 20 in FIG. 13(C). The fin holder 22 attaches the fin 3 to the flat tubes 2 in this state. Thus, the fin 3 is attached to the flat tubes 2 in a manner inclined with respect to the axes of the flat tubes 2 in the same direction as in FIG. 8(C) in Embodiment 2. The apparatus 10F then causes the fin holder 22 to stop sucking the fin 3 and moves the fin holder 22.

As shown in FIG. 13(A) to (C), after the cam-follower mover moves the cam follower 26, the fin holder 22 moves by a distance X9 in FIG. 13(A), a distance X10 in FIG. 13(B), or a distance X11 in FIG. 13(C). The fin attaching position 210 is shifted. The movable stage 40 may thus be moved in the positive X-direction by a distance smaller by the distance X9 or by a distance greater by the distance X10 or X11 than the pitch between the fins 3 in the heat exchanger 1 to be manufactured. The fins 3 may be attached to the flat tubes 2 with an intended pitch.

As described above, the apparatus 10F according to Embodiment 7 moves the cam follower 26 to attach the fin 3 to the flat tubes 2 perpendicularly to the axes of the flat tubes 2 or inclined in an intended direction.

Instead of the arc-shaped long groove 29 on the plate 25, the center shaft of the cam follower 26 may be movable along any arc about the rotation shafts 23 in the apparatus 10F according to Embodiment 7. For example, the plate 25 may have an arc-shaped guide mechanism. The above piston may instead move the center shaft of the cam follower 26 along the above arc.

Although the embodiments of the present disclosure have been described above, the present disclosure is not limited to these embodiments. For example, in Embodiment 1, the fins 3 in the area A to form a bend extend perpendicularly to the axes of the flat tubes 2. The present disclosure is not limited to this structure. In the present disclosure, the heat exchanger 1 may include fins 3 inclined with respect to the axes of the flat tubes 2.

Figure 14:
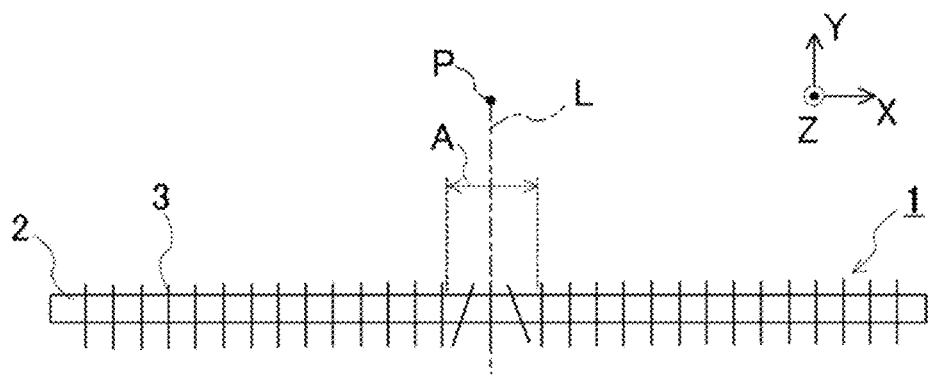
FIG. 14 is a plan view of a flat tube of a heat exchanger before bent with a method for manufacturing a heat exchanger for an air conditioner according to a modification of the present disclosure.
Figure 15:
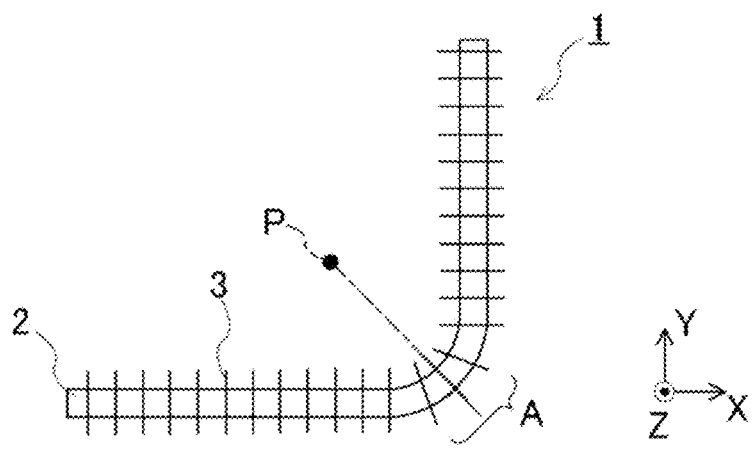
FIG. 15 is a plan view of a flat tube of a heat exchanger after bent with a method for manufacturing a heat exchanger for an air conditioner according to a modification of the present disclosure.

FIG. 14 is a plan view of the flat tubes 2 in the heat exchanger 1, 1A, or 1B before bent with a method for manufacturing the heat exchanger 1, 1A, or 1B for an air conditioner 100 according to a modification of the present disclosure. FIG. 15 is a plan view of the flat tubes 2 in the heat exchanger 1, 1A, or 1B after bent with the method according to the modification of the present disclosure.

As shown in FIGS. 14 and 15, the fins 3 in the area A to form a bend may be inclined with respect to the axes of the flat tubes 2. The fins 3 in the area other than the area A to form straight portions may be perpendicular to the axes of the flat tubes 2. This structure also has small airflow resistance in the bend of the fins 3. The heat exchanger 1 with this structure can thus enhance heat exchange efficiency.

Although the heat exchanger 1 is used for the air conditioner 100 in Embodiment 1 described above, the present disclosure is not limited to such an application. The present disclosure is also applicable to machines other than the air conditioner 100, such as a refrigerator or a boiler.

In Embodiment 2, the cam member 30 is moved in Y-direction to attach the fin 3 at the fin attaching position 210 to the flat tubes 2 at any angle. In Embodiment 3, the cam member 30 is rotated to attach the fin 3 at the fin attaching position 210 to the flat tubes 2 at any angle. In the present disclosure, the fin 3 held by the fin holder 22 at the fin attaching position 210 may be inclined with respect to the longitudinal direction of a cross section perpendicular to the axes of the flat tubes 2 as the fin holder 22 rotates. In other words, the fin attaching position 210 may be positioned to have the fin 3 held by the fin holder 22 inclined with respect to the axes of the flat tubes 2. For example, the fin 3 at the fin attaching position 210 may be inclined with respect to the longitudinal direction of a cross section perpendicular to the axes of the flat tubes 2 by changing the position at which the cam follower 26 comes in contact with the cam protrusion 31 to change the rotation amount of the fin holder 22 or 28. The cam member 30 may be moved by any method. For example, the cam member 30 may be moved in X-direction, instead of the cam member 30 being rotated in Embodiment 3.

The cam member 30 may be moved relative to the drum 20. The drum 20 may be moved instead of the cam member 30. The movable stage 40 may be moved relative to the drum 20. The drum 20 may be moved instead of the movable stage 40.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2017-83999, filed on Apr. 20, 2017, the entire disclosure of which is incorporated by reference herein.

REFERENCE SIGNS LIST 1, 1A, 1B Heat exchanger
2 Flat tube
3 Fin
3A Fin slit
3B Fin collar
10A to 10E Apparatus for manufacturing heat exchanger
20, 20A, 20B Drum
21 Shaft
22 Fin holder
23 Rotation shaft
24 Torsion spring
25 Plate
26 Cam follower
27 Through-hole
28 Fin holder
29 Long groove
30, 30A, 30B Cam member
31 Cam protrusion 32 Camshaft
40 Movable stage
41 Flat tube positioner
42 Base
43 Compression spring
44 Stopper
50 Rotation controller
51 Rod
60 Inclined stage
61 Table
62 Base
100 Air conditioner
110 Housing
120 Fan
121 Rotation center
200 Fin holding position
210 Fin attaching position
220 Straight line
A Area
C Center axis
D1, D2 Distance
E Protrusion end
L Straight line
P Point
P1, P2 Direction
R, R1, R2 Direction
S3, S4 Length
W Direction
X1 to X11 Distance
Y1, Y2, Y5, Y6 Distance
Q1 to Q4 Direction

The invention claimed is:

1. An apparatus for manufacturing a heat exchanger including a flat tube and a fin attached to the flat tube with an outer periphery of the flat tube being fitted to a fitting groove on the fin, the apparatus comprising:
  a drum rotatable about a center axis;
  a fin holder arranged in a radial direction of the drum and configured to hold the fin with the fitting groove open outward in a direction of an outer periphery of the drum, the fin holder being rotatably held by the drum and movable to a fin attaching position when the drum rotates;
  a flat tube positioner configured to restrict the flat tube to a position at which a cross section of the flat tube perpendicular to the axis of the flat tube has a longitudinal direction toward the drum;
  a moving mechanism configured to move the flat tube restricted by the flat tube positioner to the fin attaching position; and
  a cam follower arranged on the fin holder and configured to, when the fin holder moves to the fin attaching position, come in contact with a cam member to rotate the fin holder,
  wherein the fin attaching position includes a position at which the rotated fin holder inclines the fin held by the fin holder with respect to the longitudinal direction of the flat tube and the fin is fixed to the tube at an inclined position with respect to the longitudinal direction of the flat tube.

2. The apparatus according to claim 1, further comprising a cam mover to move the cam member to change a position at which the cam follower comes in contact with the cam member.

3. The apparatus according to claim 2, wherein the cam mover includes a moving mechanism to move the cam member toward or away from the center axis.

4. The apparatus according to claim 2, wherein the cam mover includes a moving mechanism to move the cam member toward the axis of the flat tube restricted by the flat tube positioner.

5. The apparatus according to claim 1, further comprising a rotation controller extensible to come in contact with the fin holder at the fin attaching position and to rotate the fin holder.

6. The apparatus according to claim 1, wherein the fin holder has an inclined surface that is inclined with respect to the axis of the flat tube restricted by the flat tube positioner at the fin attaching position.

7. The apparatus according to claim 1, further comprising an inclination mechanism configured to cause the flat tube positioner to be inclined with respect to the fin held by the fin holder at the fin attaching position.

8. The apparatus according to claim 1, further comprising a cam-follower mover configured to move the cam follower to change an amount by which the fin holder rotates in response to the cam follower coming in contact with the cam member.

9. The apparatus according to claim 1, wherein the flat tube positioner includes a pressing member configured to press the flat tube against the fin held by the fin holder at the fin attaching position.

* * * * *